US006744648B2

United States Patent
Chen

(10) Patent No.: US 6,744,648 B2
(45) Date of Patent: Jun. 1, 2004

(54) ACTIVE BACKUP POWER SUPPLY WITH POWER FACTOR CORRECTION AND OUTPUT VOLTAGE REGULATION

(75) Inventor: Hui-Jung Chen, Taipei (TW)

(73) Assignee: Digi Power Manufacturing Inc., Taipei (TW)

( * ) Notice: Subject to any disclaimer, the term of this patent is extended or adjusted under 35 U.S.C. 154(b) by 0 days.

(21) Appl. No.: 10/211,298

(22) Filed: Aug. 5, 2002

(65) Prior Publication Data

US 2004/0022079 A1 Feb. 5, 2004

(51) Int. Cl.[7] ............................................. H02M 7/797
(52) U.S. Cl. ............................ 363/98; 363/89; 363/132
(58) Field of Search ........................... 323/207, 208, 323/209, 210, 211; 363/89, 95, 98, 132

(56) References Cited

U.S. PATENT DOCUMENTS

| 4,691,274 A | * | 9/1987 | Matouk et al. ............... 363/141 |
| 4,719,550 A | * | 1/1988 | Powell et al. ................. 363/37 |
| 5,369,563 A | * | 11/1994 | Miller ........................... 363/98 |
| 5,384,792 A | * | 1/1995 | Hirachi ........................ 307/64 |
| 5,519,306 A | * | 5/1996 | Itoh et al. .................... 323/207 |
| 5,610,805 A | * | 3/1997 | Gupta ........................... 363/37 |
| 5,686,768 A | * | 11/1997 | Thomsen et al. ............. 307/64 |
| 5,737,204 A | * | 4/1998 | Brown ......................... 363/89 |
| 6,069,412 A | * | 5/2000 | Raddi et al. .................. 307/66 |
| 6,288,916 B1 | * | 9/2001 | Liu et al. ...................... 363/37 |
| 6,507,507 B2 | * | 1/2003 | Tokunaga et al. ............. 363/89 |

* cited by examiner

Primary Examiner—Jeffrey Sterrett
(74) Attorney, Agent, or Firm—Troxell Law Office PLLC

(57) ABSTRACT

An active backup power supply with PFC and power output regulation comprises a power factor correction (PFC) circuit, a backup battery, an inverter and a control circuit. The said PFC circuit outputs current drawn as low THD (total harmonic distortion) and non-pulsating current from municipal power source. The said inverter connects to the PFC circuit and the backup battery at one end and outputs a precisely regulated power source at the other end. The said controller is to control the voltage relation between the PFC circuit and the inverter, so the PFC circuit is controlled in voltage boost mode to draw non-pulsating current from municipal power. With the above-mentioned components, the present invention enables an output power with PFC and voltage regulation to the load device (FIG. 3).

6 Claims, 6 Drawing Sheets

ACTIVE BACKUP POWER SUPPLY WITH POWER FACTOR CORRECTION AND OUTPUT VOLTAGE REGULATION

BACKGROUND OF THE INVENTION

1. Field of the Invention

The present invention relates to an active power supply with power factor correction and output voltage regulation, which especially means a device that can achieve power factor correction by drawing low THD (total harmonic distortion) and non-pulsating current from municipal power supply (alternating current and precisely regulate the output voltage.

2. Description of the Prior Art

Traditional interactive uninterrupted power supply (UPS) that has a voltage stabilizer to regulate the voltage is shown in FIG. 1. This kind of interactive UPS is also called single conversion UPS. When compared to relatively traditional ON-Line UPS, it has the advantage of using fewer components, so its reliability and efficiency is higher. Nevertheless, its disadvantage is no power factor correction for input power. Therefore, when the UPS is subject to a nonlinear load, it fails to meet the harmonic wave current regulation, such as IEC1000-3-2. Besides, the interactive UPS also can cause stepwise voltage fluctuations and imprecise voltage control. Please refer to FIG. 2, which is related to U.S. Pat. No. 5,334,877 and applicable to the interactive UPS. Although the patent describes a method that is capable of power factor correction, it still fails to perform precise regulation on output voltage.

Accordingly, the above-mentioned device still has many disadvantages and needs further improvement.

In view of the disadvantages for the traditional device, the inventor is eager to seek improvement and innovation. After many years of research and development, the inventor finally accomplished the present invention of an active backup power supply with power factor correction and output voltage regulation.

SUMMARY OF THE INVENTION

It is the objective of the present invention to provide an active backup power supply with power factor correction and output voltage regulation, which not only improves THD and regulates output voltage, but also harmonic wave current. Thus, both input current and the size of electromagnetic component are minimized.

Another objective of the present invention is to provide an active backup power supply with power factor correction and output voltage regulation, which improves the traditional device over the stepwise voltage fluctuation and imprecise voltage regulation.

The active backup power supply with power factor correction and output voltage correction to achieve the above-mentioned objectives comprises: a power factor correction circuit (PFC), an inverter with two outputs, a backup battery and a control circuit. The power factor correction circuit connects to AC power source (municipal power supply) to draw low THD current, which flows through the first output of an inverter and then goes to the load via the second output. For the municipal power supply, current with PFC is dependent on input power, which is equivalent to the real power required by the load. The second output of the inverter connects to the output of UPS. The first output of the inverter is controlled by PFC to be higher than the municipal input voltage. So PFC can operate in voltage boost mode and draw non-pulsating current. Meanwhile, the inverter is controlled by PFC to generate a fixed voltage source. Besides, the fixed voltage source from the inverter and the current source from PFC are parallel connected to provide power to the load. When the load is resistive or linear, its current is fully supplied by PFC and there is almost no current flowing through the inverter. When the inverter is non-linear, it will draw distorted current and the current difference between load demand and PFC supply will flow through the inverter. Since the inverter is a power source of low resistance in nature and its current can cause very minimal voltage distortion, stable and regulated output voltage can be generated.

BRIEF DESCRIPTION OF THE DRAWINGS

The drawings disclose an illustrative embodiment of the present invention, which serves to exemplify the various advantages and objects hereof, and are as follows:

FIG. 5a is a schematic diagram illustrating an embodiment for the two-way switch in the active backup power supply with power factor correction and power output regulation according to the present invention;

DETAILED DESCRIPTION OF THE PREFERRED EMBODIMENT

Figure 1:
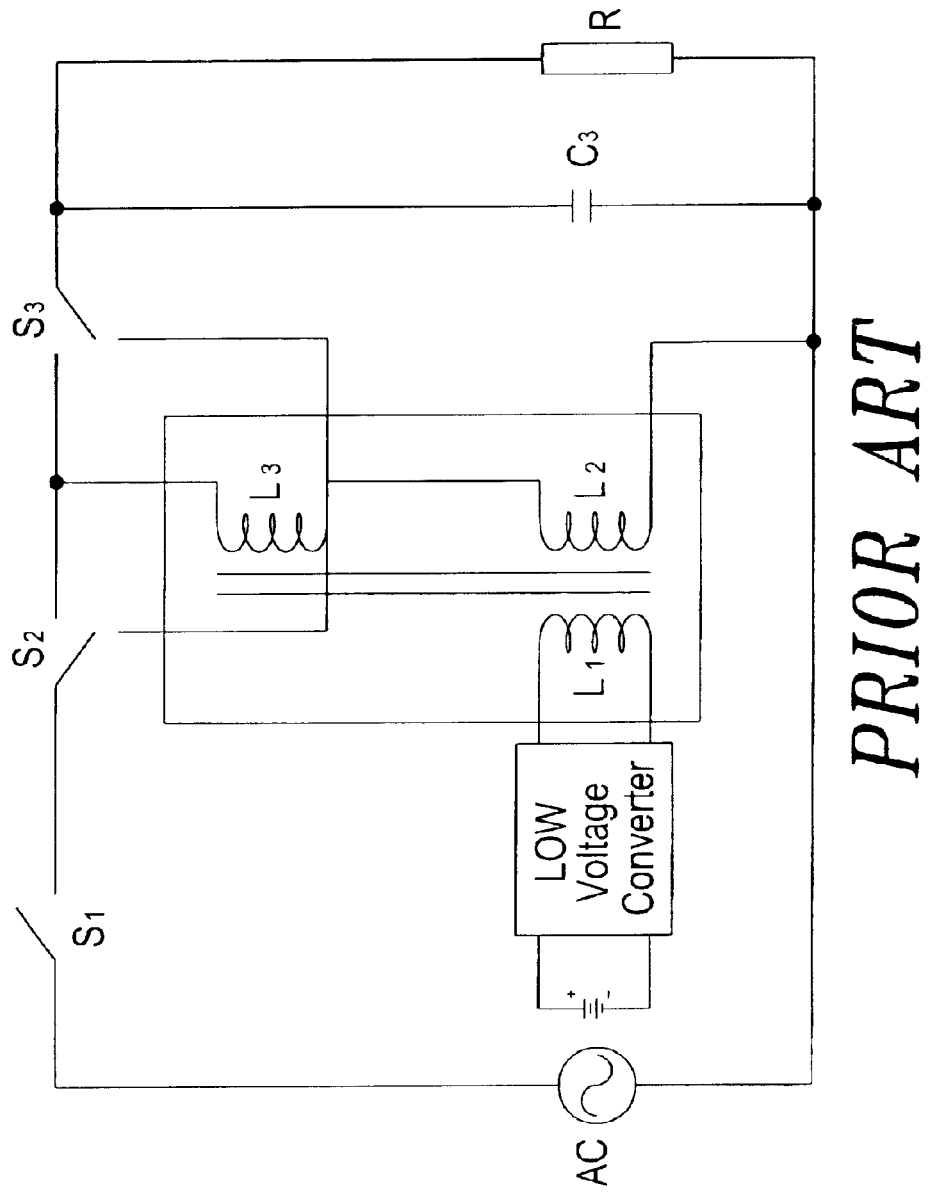
FIG. 1 is a schematic diagram illustrating the architecture for interactive UPS with buck and boost function.
Figure 2:
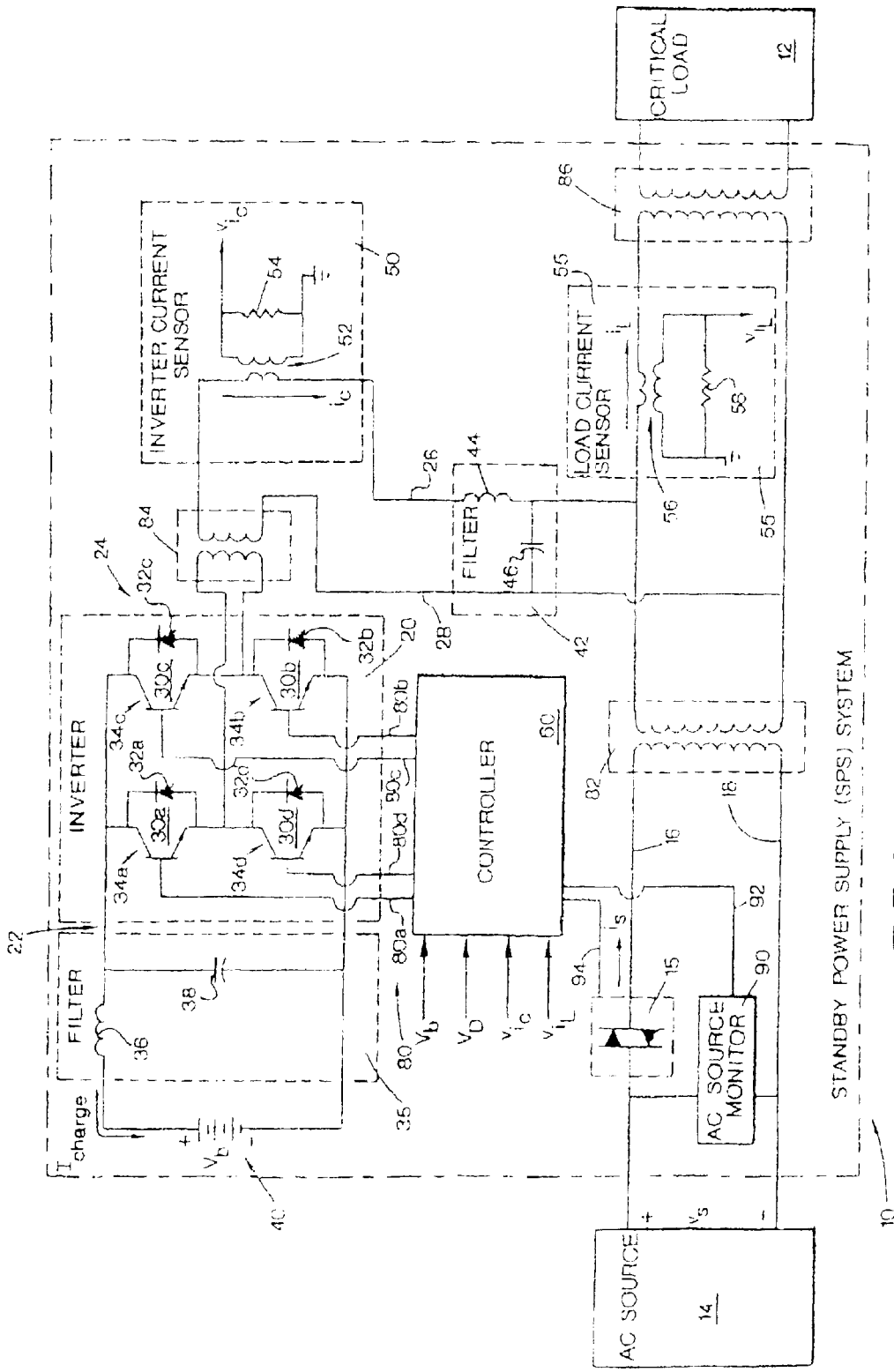
FIG. 2 is a schematic diagram illustrating traditional architecture for the interactive UPS described in U.S. Pat. No. 5,334,877.
Figure 3:
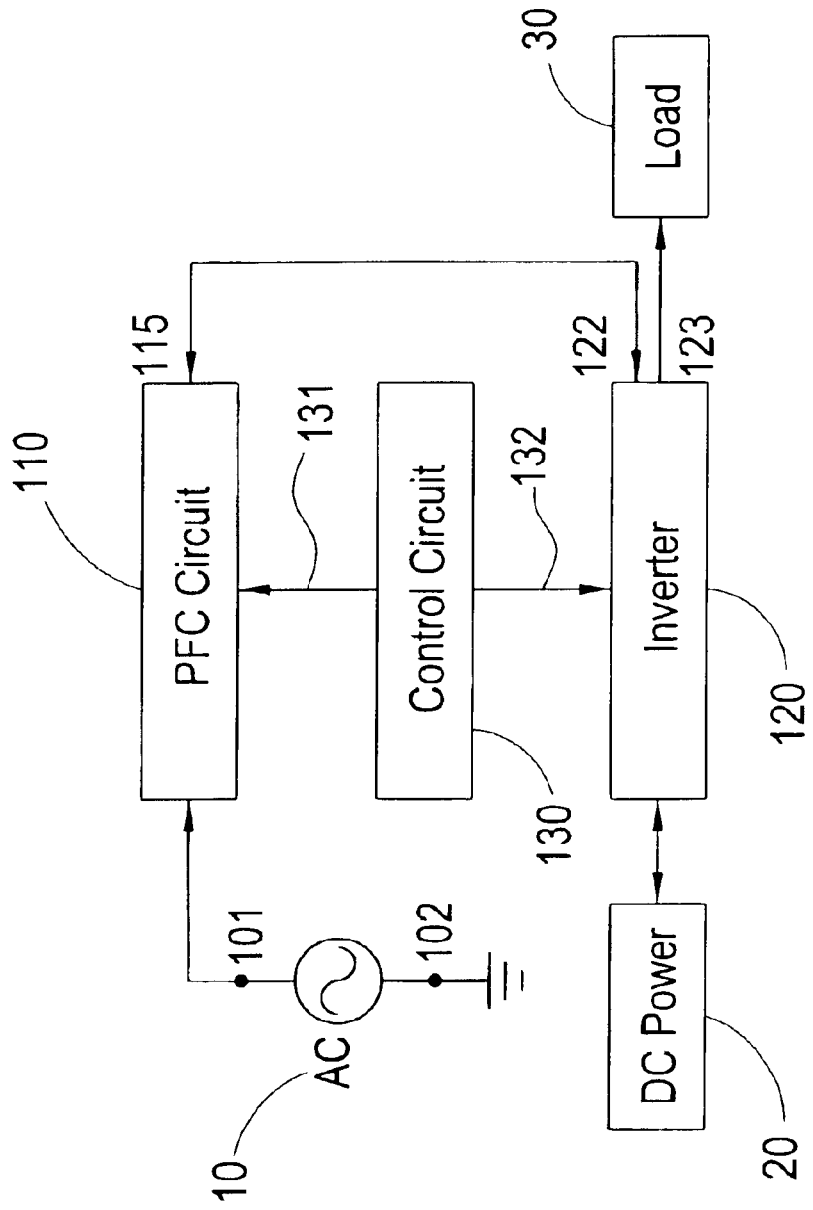
FIG. 3 is a schematic diagram illustrating an embodiment for the active backup power supply with power factor correction and power output regulation according to the present invention.

FIG. 3 illustrates an embodiment of the active backup power supply with power factor correction and power output regulation according to the present invention. It mainly comprises a PFC circuit 110, an inverter 120, an AC input power source 10 (municipal power supply), a backup battery 20 (DC power source) and a control circuit 130. The PFC circuit 110 draws current with controlled intensity and waveform from municipal power supply 10 and transmits the current to the first output 122 of the inverter 120. The second output 123 of the inverter 120 connects to the load 30. The inverter 120 can transform the backup battery 20 into two precisely regulated power sources. The voltage for the first output 122 for the inverter 120 is larger than that for municipal power, so PFC circuit 110 operates in boost voltage mode and draws non-pulsating current from the municipal power 10. The current between the two outputs, 122 and 123, for the inverter 120 is bi-directional. PFC circuit 110 receives the first control signal 131 from the control circuit 130, so the current output from PFC circuit 110 to the inverter 120 is low THD current, which is regulated to meet the demand of the load 30. The inverter 120 is also controlled by the second control signal 132 of the control circuit to generate two precisely regulated voltages.

Figure 4:
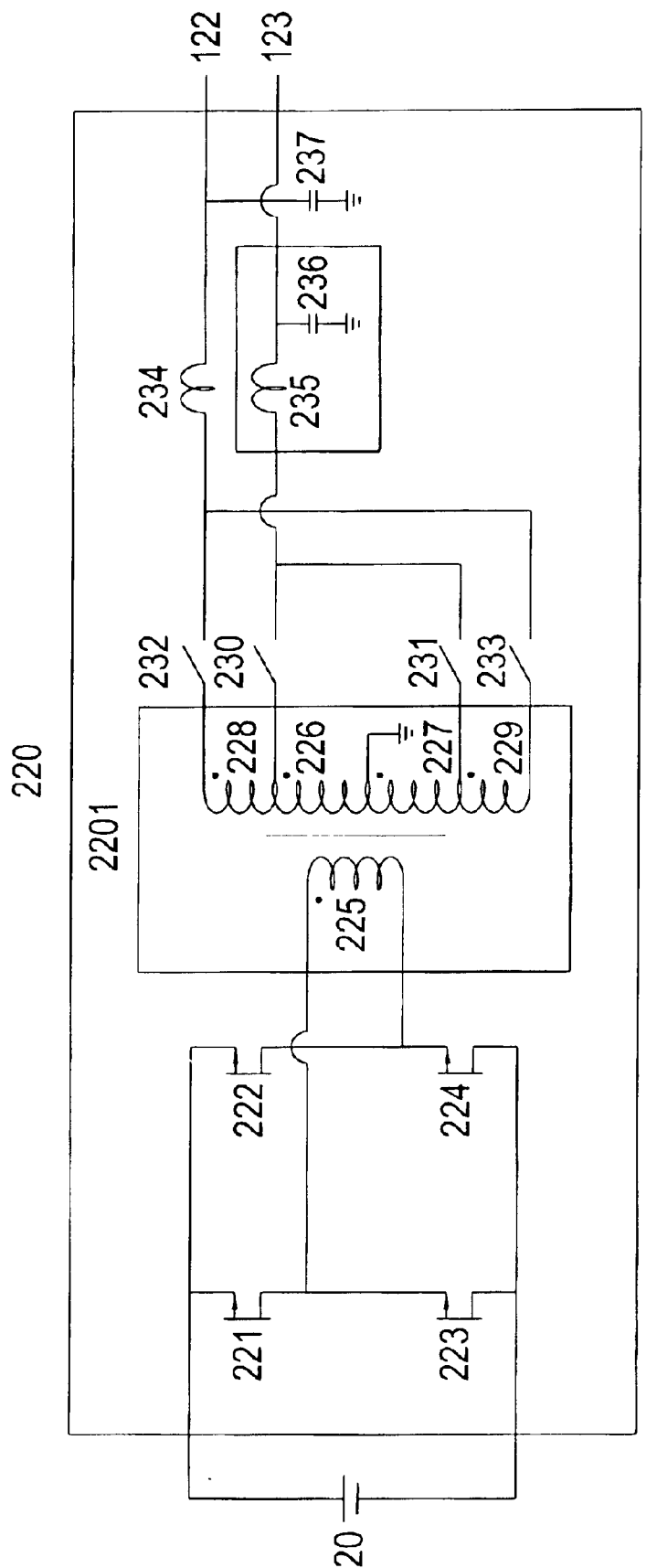
FIG. 4 is a schematic diagram illustrating the first embodiment for the inverter in the active backup power supply with power factor correction and power output regulation according to the present invention.

FIG. 4 illustrates an embodiment of the inverter 220 according to the present invention. The circuit is an inverter of high frequency link in nature. This technology is originally related to a paper published in 1982 with title "A comparison of high frequency link schemes for interfacing a dc source to a utility grid" in IEEE IAS Annual meeting by R. L. Steigewald and R. E. Tokins. The inverter 220 includes four switches, 224, 222, 223 and 224. The four switches cut DC power into AC power and connect to a primary coil 225 in the high frequency transformer 2201. The first two-way switch 230 connects to the first secondary coil 226 in the high frequency transformer. The second two-way switch 231 connects to the second secondary coil 227 in the high frequency transformer. The connection formed by the first two-way switch 230 and the second two-way switch 231 is directed to the second output 123 of the inverter 220 via a filter. The filter comprises an inductor 235 and a capacitor 236. According to an embodiment of the present invention, the above device is a traditional HF LINK inverter with two additional secondary coils, 228 and 229, two two-way switches, 232 and 233, and a filter. The filter comprises an inductor 234 and a capacitor 237. The methods to generate control signals can be found in many literatures, such as "Bilateral DC to AC Converter Employing a High Frequency Link," 1985 IEEE/IAS Annual meeting Record, pp. 1156–1162. This can be accomplished by those who are familiar with the practice of such arts in the field.

Figure 5:
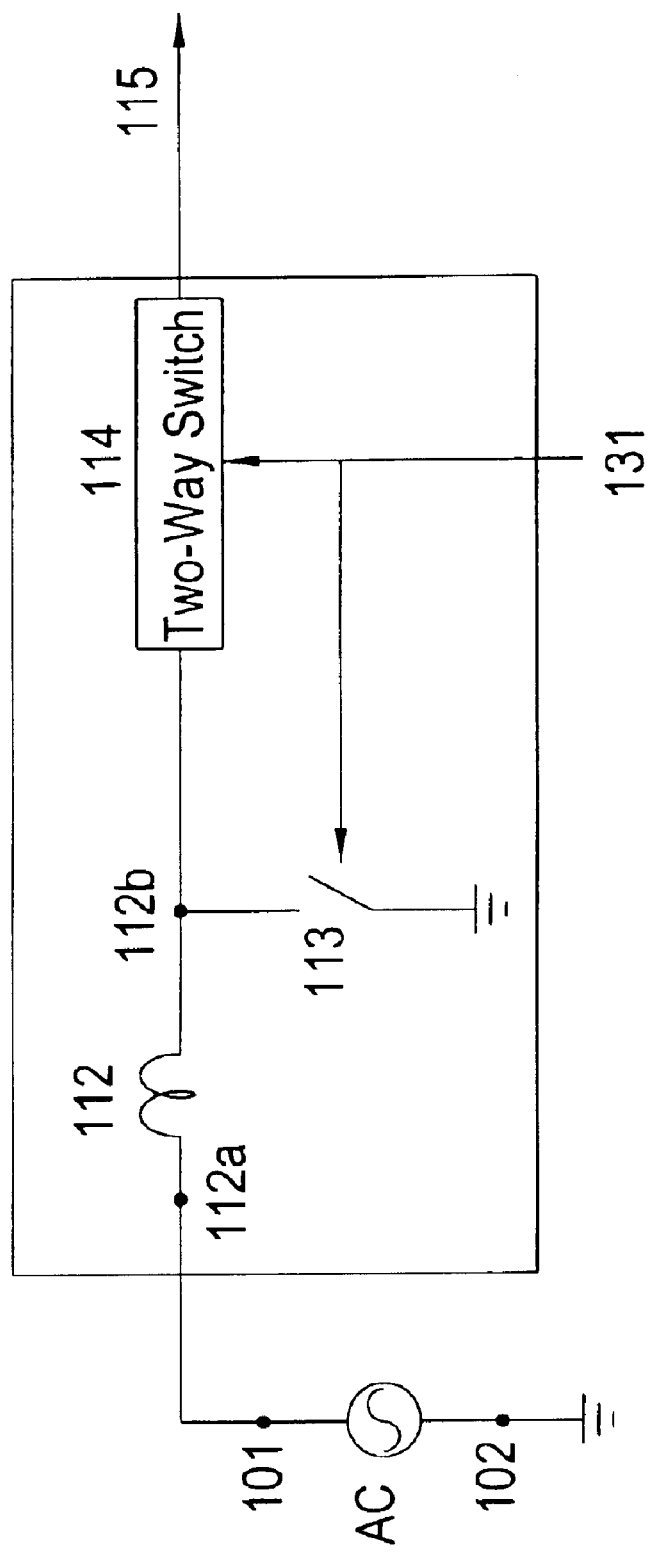
FIG. 5 is a schematic diagram illustrating an embodiment for the PFC circuit in the active backup power supply with power factor correction and power output regulation according to the present invention.
Figure 5:
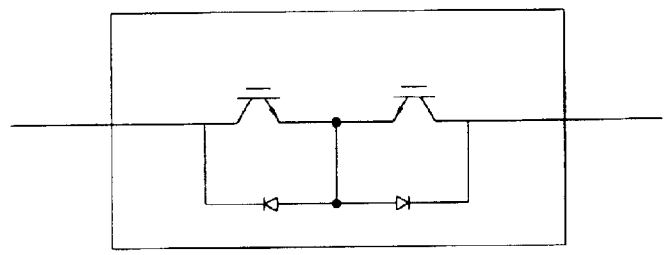

FIG. 5 illustrates an embodiment for the PFC circuit 110 according to the present invention. This circuit 110 comprises an inductor 112, which has the first terminal 112a connected to the line bus 101 of municipal power and the second terminal 112b connected to the neutral bus 102 of municipal power via the first two-way switch 113 and to the PFC circuit output 122 via the second two-way switch 114. When both the inductor current and the output voltage are of positive semi-cycle, the second two-way switch is selectively controlled to transmit current from the inductor 112 to the output 115 of PFC circuit. However, when both the inductor current and the output voltage are of negative semi-cycle, the second two-way switch is selectively controlled to transmit current from the output 115 of PFC circuit to the inductor 112. There are many traditional PFC circuit controllers, such as Unitrode 3854 and ST L4981 etc. Those who are familiar with the practice of such arts can achieve the same result by using the said controllers or the equivalent digital control methods.

FIG. 5(a) illustrates an embodiment for a two-way switch 114, which is formed by connecting the emitters (E) of two IGBT transistors (C, G, E). Both the two IGBT transistors contain a diode inside. The transmitted current flows to either IGBT transistor via selective connection by the two-way switch.

Figure 6:
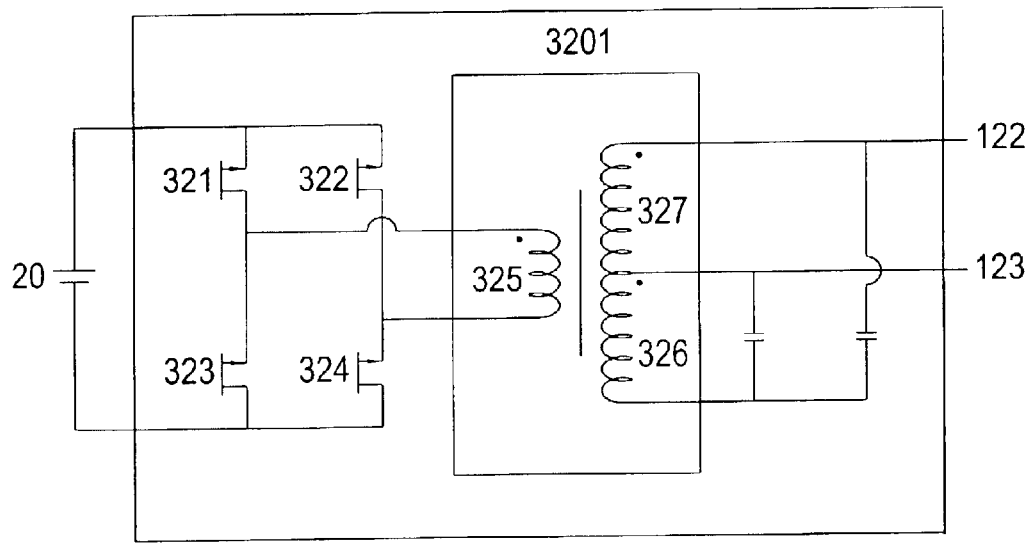
FIG. 6 is a schematic diagram illustrating the second embodiment for the inverter in the active backup power supply with power factor correction and power output regulation according to the present invention.

FIG. 6 illustrates an embodiment for another inverter 320, which comprises four switches, 321, 322, 323 and 324, and a transformer 3201. The transformer 3201 comprises a primary coil 325, the first secondary coil 326 and the second secondary coil 327. The said four switches cut DC power into AC power, which is coupled via the transformer 320 to the first and the second outputs of the inverter 320. The polarity for the first secondary coil 326 and the second secondary coil 327 allows the inverter 320 to have the first output 122 higher than the second output 123 by a fixed value. Further, the control mode for the inverter 320 can be either voltage mode or current mode.

When compared to previously mentioned examples and other traditional technologies, the active backup power supply with PFC and power output regulation in the present invention has the following advantages 1. The present invention is to provide an active backup power supply with PFC and power output regulation, which can improve THD for the input current and the regulation for the output voltage in addition to harmonic wave current. Thus, both the input current and the electromagnetic components are minimized.

2. The present invention is to provide an active backup power supply with PFC and power output regulation, which can improve traditional voltage regulator over stepwise voltage fluctuation and imprecise voltage regulation.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An active backup power supply with power correction factor (PCF) and output voltage regulation comprising:
    a) an AC power source;
    b) a PFC circuit electrically connected to and drawing a current with a controlled intensity and wave form the AC power source, the PFC circuit operating in a boost mode;
    c) an inverter having:
        i) switching components; and
        ii) a transformer having a first, a second, and a third output terminal, the first output terminal connected to an AC output terminal of the PFC circuit and drawing power from the PFC circuit; amplitudes of voltages on the first output terminal and the second output terminal with respect to the third output terminal are set at a predetermined ratio, the amplitude of voltage on the first output terminal is greater than the amplitude of voltage on the second output terminal;
    d) a backup power source electrically connect to the second output terminal of the transformer, the third output terminal of the transformer being a neutral bus for the backup power source; and
    e) a control circuit electrically connected to the inverter and generating a regulated output voltage, the control circuit electrically connected to the PFC circuit and drawing a high power factor current from the backup power source.

2. The active backup power supply according to claim 1 wherein the inverter transforms DC power into a regulated power source that is transmitted to the PFC circuit, such that power output form the inverter is greater than the power drawn from the AC power source.

3. The active backup power supply according to claim 1 wherein the control circuit regulates a current flowing from the PFC circuit to the inverter to be a low THD current and to meet a demand by a load, the inverter transforms DC power into a regulated voltage via a control signal of the control circuit.

4. The active backup power supply according to claim 1 wherein an inductor current and an out put voltage of the PFC circuit are positive semi-cycle, the inductor current is selectively transmitted from the inductor to the AC output of the PFC circuit.

5. The active backup power supply according to claim 1 wherein an inductor current and an out put voltage of the PFC circuit are negative semi-cycle, the inductor current is selectively transmitted from the AC output of the PFC circuit to the inductor.

6. The active backup power supply according to claim 1 wherein the control methods for the inverter are one of either a voltage mode or a current mode.

* * * * *